(12) United States Patent
Saint-Michel

(10) Patent No.: US 7,911,103 B2
(45) Date of Patent: Mar. 22, 2011

(54) ROTARY ELECTRICAL MACHINE INCLUDING POLE PIECES AND PERMANENT MAGNETS

(75) Inventor: Jacques Saint-Michel, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 137 days.

(21) Appl. No.: 12/159,870

(22) PCT Filed: Dec. 26, 2006

(86) PCT No.: PCT/FR2006/051424
§ 371 (c)(1),
(2), (4) Date: Jul. 29, 2008

(87) PCT Pub. No.: WO2007/077381
PCT Pub. Date: Jul. 12, 2007

(65) Prior Publication Data
US 2009/0009022 A1 Jan. 8, 2009

(30) Foreign Application Priority Data
Jan. 3, 2006 (FR) ................................. 06 50021

(51) Int. Cl.
*H02K 21/14* (2006.01)
(52) U.S. Cl. ............................. 310/156.43; 310/156.48
(58) Field of Classification Search ............. 310/156.07, 310/48, 49
See application file for complete search history.

(56) References Cited

U.S. PATENT DOCUMENTS

| | | | | |
|---|---|---|---|---|
| 3,334,254 A | * | 8/1967 | Kober | 310/156.07 |
| 4,629,924 A | * | 12/1986 | Grosjean | 310/257 |
| 5,952,758 A | * | 9/1999 | Lucidarme et al. | 310/162 |
| 6,144,132 A | * | 11/2000 | Nashiki | 310/156.55 |
| 6,323,572 B1 | * | 11/2001 | Kinoshita | 310/156.07 |
| 6,833,647 B2 | | 12/2004 | Saint-Michel et al. | |
| 7,388,310 B2 | * | 6/2008 | Abou-Akar et al. | 310/156.48 |
| 2005/0127769 A1 | | 6/2005 | Minagawa | |
| 2005/0179337 A1 | | 8/2005 | Hasebe et al. | |
| 2006/0028093 A1 | * | 2/2006 | Minagawa et al. | 310/268 |
| 2006/0097594 A1 | * | 5/2006 | Abou-Akar et al. | 310/156.01 |
| 2006/0284507 A1 | | 12/2006 | Murakami | |

FOREIGN PATENT DOCUMENTS

| | | |
|---|---|---|
| EP | 1 152 516 A2 | 11/2001 |
| EP | 1 624 554 A1 | 2/2006 |
| JP | A-61-244250 | 10/1986 |
| JP | A-2000-278894 | 10/2000 |
| JP | A-2001-238382 | 8/2001 |
| JP | A-2005-176575 | 6/2005 |
| JP | A-2006-166626 | 6/2006 |
| JP | A-2006-311772 | 11/2006 |

* cited by examiner

*Primary Examiner* — Quyen Leung
*Assistant Examiner* — Naishadh N Desai
(74) *Attorney, Agent, or Firm* — Oliff & Berridge, PLC

(57) ABSTRACT

The present invention relates to a rotary electrical machine comprising:
- at least one stator; and
- at least one rotor;
- the rotor having an axis of rotation and co-operating with the stator to define at least one airgap, the rotor comprising permanent magnets and pole pieces between the magnets;
- at least one pole piece being associated with one or more permanent magnets to concentrate the magnetic flux from said magnet(s); and
- said magnet(s) defining at least three different directions of magnetization, the resultant flux in the pole piece towards the stator being non-coplanar with at least two of the directions of magnetization.

40 Claims, 3 Drawing Sheets

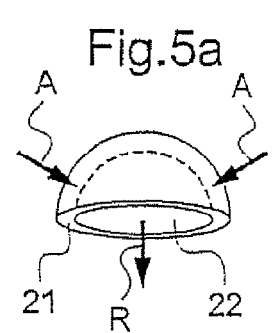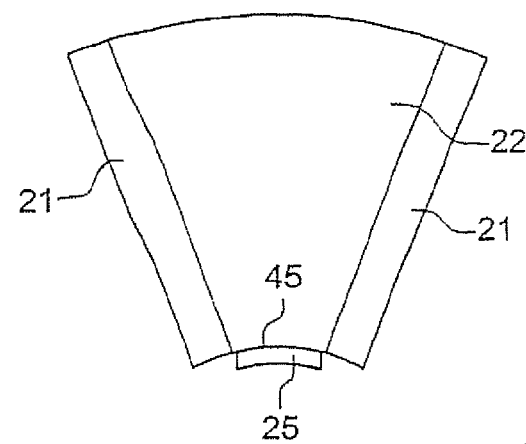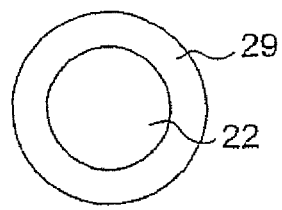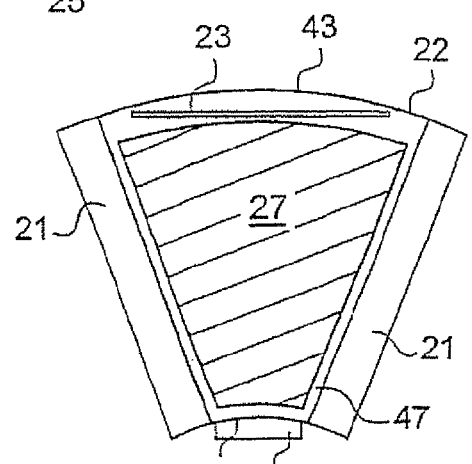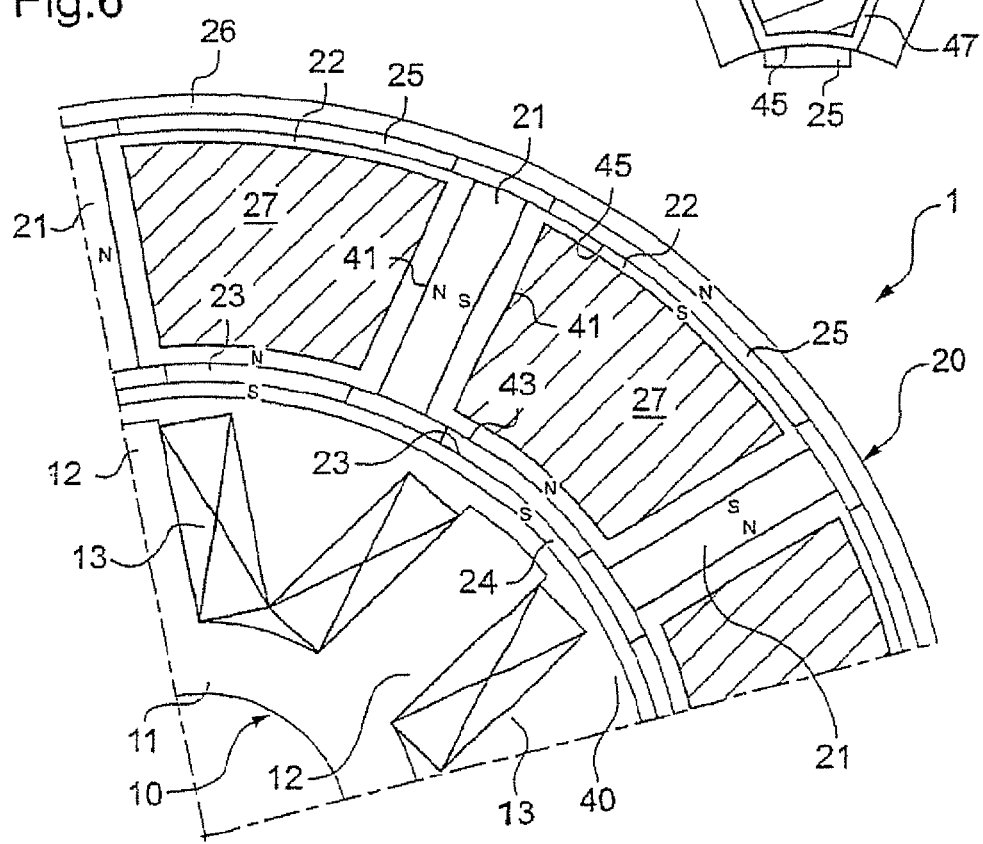

ROTARY ELECTRICAL MACHINE INCLUDING POLE PIECES AND PERMANENT MAGNETS

The present invention relates to rotors having permanent magnets and to rotary electrical machines including such rotors.

U.S. Pat. No. 6,833,647 and US patent application No. 2005/0179337 disclose discoid machines, and European patent application No. 1 152 516 discloses radial electrical machines, those discoid or radial machines having permanent magnets, with the direction of magnetization of the magnets not being directed towards the stator. In those machines, the flux from the magnets is concentrated by pole pieces that are disposed between the magnets.

In U.S. Pat. No. 6,833,647, the magnets associated with a pole piece define only two directions of magnetization, and they are coplanar.

There exists a need to further improve permanent magnet machines, e.g. so as to increase their efficiency or their torque, and/or to reduce their size. The invention thus provides a rotary electrical machine comprising:

at least one stator; and at least one rotor;

the rotor having an axis of rotation and co-operating with the stator to define at least one airgap, the rotor comprising permanent magnets and pole pieces between the magnets;

at least one pole piece being associated with one or more permanent magnets to concentrate the magnetic flux from said magnet(s); and said magnet(s) defining at least three different directions of magnetization, the resultant flux in the pole piece towards the stator being non-coplanar with at least two of the directions of magnetization.

Two different directions of magnetization for one or more permanent magnets associated with a given pole piece may make an angle of more than 20° relative to each other.

At least one of the directions of magnetization need not be directed towards the airgap.

When at least three directions of magnetization are associated with a single pole piece, two of the three directions may be parallel to a plane perpendicular to the axis of rotation, while the third direction is, for example, parallel to the axis of rotation, going towards the stator.

The presence of pole pieces can enable the size of the magnets to be reduced.

At least one pole piece, and possibly all of the pole pieces, may have at least three faces disposed facing permanent magnets. These faces may have respective normals that are not coplanar.

At least one pole piece may be hexahedral. At least one pole piece may have five faces facing permanent magnets and a sixth face that does not have a magnet. The face without a magnet may face the airgap and the stator.

The magnets surrounding the pole piece may enable the magnetic flux in the pole piece to be increased and may also make it possible to avoid leakage flux from the faces of the pole piece that face those magnets, in particular the faces that do not have magnets in prior art machines.

Thus, the concentration of flux in the pole pieces is improved, thereby enabling magnetic leakage to be decreased.

The pole pieces may have faces that can be plane, concave, or convex. The pole pieces may have six faces, one of which faces towards the airgap, and another of which faces away from the airgap, two further faces facing adjacent pole pieces in a circumferential direction, and finally two side faces interconnecting the other four faces.

The pole pieces may have faces directed towards the airgap that are disposed facing permanent magnets. In a variant, the permanent magnets may be disposed in housings within the pole pieces under the surfaces thereof that face towards the airgap.

The pole pieces may have faces that face away from the airgap and that are disposed facing permanent magnets.

At least one permanent magnet may be disposed facing a side face of a pole piece.

At least one permanent magnet may be disposed facing a face of a pole piece situated at the outer periphery of the rotor.

At least one permanent magnet may be disposed on a face of a pole piece facing the axis of rotation of the rotor.

The flux from a magnet disposed on a face of a pole piece that faces an adjacent pole piece may pass between the pole piece in question and the adjacent pole piece.

For example when the pole pieces include magnets disposed on their side faces or on their faces facing towards or away from the airgap, the rotor may include at least one magnetic circuit enabling the magnetic flux to pass between two circumferentially consecutive permanent magnets. The magnetic flux from a magnet thus passes between a pole piece and the magnetic circuit.

In a variant, the magnets facing the airgap need not be associated with a magnetic part.

By way of rotor, the above-mentioned magnetic circuit may comprise a ring disposed against the magnets on the axis of the machine. By way of example, the magnetic circuit may comprise two rings disposed at each of the axial ends of the rotor. The magnetic circuit may also comprise a tubular casing surrounding the rotor at its periphery. The magnetic circuit may comprise a sleeve surrounding a rotor shaft.

The shaft may be made of a material that is non-magnetic, or on the contrary it may be made of a magnetic material.

Permanent magnets may be disposed on at least one face of a pole piece that faces towards an adjacent pole piece.

At least one pole piece may be associated with a magnet of annular shape.

The permanent magnets may completely surround the pole piece or they may surround it in part only. At least one pole piece may for example be associated with a permanent magnet of annular shape that is mounted around the pole piece.

The term "annular shape" should be understood broadly, and in particular that the magnet forms a closed curve, e.g. a curve that is circular, oblong, or of some other shape.

In an embodiment of the invention, at least one pole piece may be associated with a permanent magnet of a shape that includes a recess, e.g. a spherical cap. The pole piece may occupy the recess in the magnet. Such a configuration can serve to reduce the volume of magnet that is needed to achieve the desired magnetic flux. The permanent magnets of hollow shape may define at least three directions of magnetization that are not coplanar.

The pole pieces need not be interconnected magnetically. In a variant, the pole pieces may be interconnected magnetically, in particular via magnetic bridges, e.g. for mechanical reasons.

The stator may have magnetic cores with coils disposed thereon, the magnetic cores being made of rolled-up strip material, for example. The strip material need not necessarily include notches formed by cutting the material.

At least one of the pole pieces of the rotor, the magnetic cores of the stator, and/or the magnetic circuit of the rotor may comprise a rolled-up strip of sheet material that is subsequently pressed into shape, where necessary, e.g. to have an oblong or a sector shape.

By way of example, the sheet material used may be relatively fine. The shape of the pole pieces may be circular, elliptical, or sector-shaped. A sector shape can make it possible to obtain relatively good flux distribution in the airgap.

Particularly with a discoid machine, the sheet material may be oriented in such a manner that the magnetic flux passes through the thin direction of the sheet so as to diminish magnetic losses.

The resulting magnetic flux in at least one pole piece may present a direction that is parallel to the axis of rotation.

The rotor may face the stator along the axis of rotation, or in a variant the machine may comprise two rotors disposed on either side of the stator along the axis of rotation. In another variant, the machine may have two stators disposed on either side of a central rotor along the axis of rotation. The machine may have a plurality of stators and a plurality of rotors disposed in alternation along the axis of rotation.

The resulting magnetic flux in at least one pole piece may have a direction that is perpendicular to the axis of rotation.

The machine may be radial, with the rotor and the stator being concentric. The rotor may be a radially-outer or a radially-inner rotor. The machine may also have two rotors, one constituting a radially-outer rotor and the other a radially-inner rotor.

The stator may have concentrated winding.

When the rotor is for fitting to a radial machine, the magnetic circuit may for example include a ring disposed against the side magnets, along the axis of the machine. Where necessary, the rotor may have two rings disposed at each of the axial ends of the rotor. In addition, when the magnets have magnetization directed towards the airgap, the magnets may be embedded under the surfaces of the pole pieces and it need not be necessary to use the above-mentioned magnetic circuit.

When the magnets are disposed at the surfaces of the pole pieces, the rotor may include a magnetic circuit. The magnetic circuit may surround the shaft of the machine or it may be constituted by the shaft of the machine when the rotor is an inner rotor, or in a variant it may include a tubular casing surrounding the periphery of the rotor when the rotor is an outer rotor. Similarly, the rotor may include a magnetic circuit for passing flux from magnets placed on the face that faces away from the airgap, where necessary. The magnetic circuit may include a tubular casing, or a sleeve surrounding the shaft, or it may be constituted by the shaft of the machine, depending on whether the rotor is an inner rotor or an outer rotor.

For a rotor that is to be fitted to a discoid machine, the magnetic circuit may, for example, include a ring placed against the magnets facing the airgap, i.e. a ring placed against the magnets along the axis of the machine, or on the contrary it need not have such a ring. The magnetic circuit may likewise include a ring disposed around the axis of the machine, against the magnet placed remote from the airgap. Finally, the magnetic circuit may include a tubular casing surrounding the magnets and the outer periphery of the rotor, and a sleeve surrounding the shaft of the machine. In another variant, the shaft of the machine may constitute the magnetic circuit for passing flux from the magnets disposed on the sides of the pole pieces that face the axis of the machine.

The invention also provides a rotary electrical machine comprising at least one stator and at least one rotor, the rotor having an axis of rotation and co-operating with the stator to define at least one airgap, the rotor comprising permanent magnets and pole pieces between the magnets, at least one pole piece being associated with one or more permanent magnets defining at least three directions of magnetization that are spaced apart angularly by more than 20°, at least one of which is not directed towards the airgap. As mentioned above, these directions of magnetization need not be coplanar.

The invention can be better understood on reading the following detailed description of embodiments of the invention, and on examining the accompanying drawings, in which.

Figure 7:
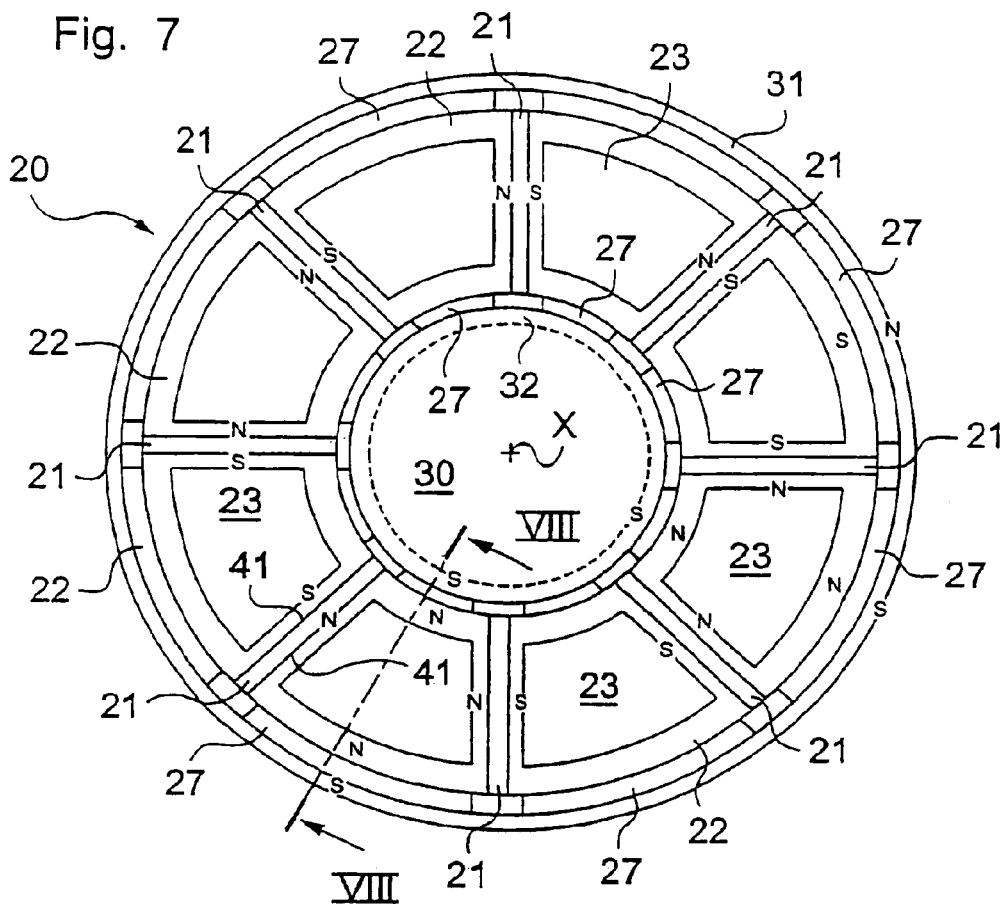
Figure 8:
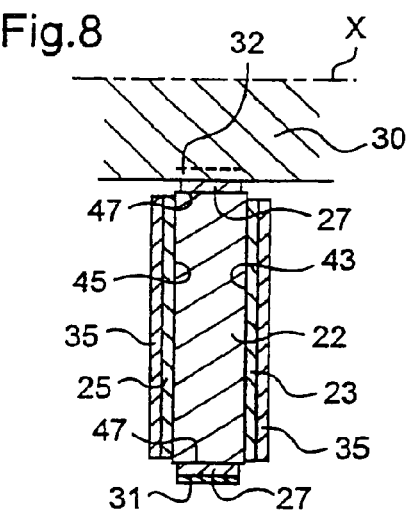

FIGS. 3 to 5 and 5*a* show in isolation various pole pieces surrounded by magnets;

FIG. 6 is a diagrammatic and fragmentary section of a variant embodiment;

FIG. 7 shows a discoid machine rotor of the invention;

FIG. 8 is an axial section on VIII-VIII of the FIG. 7 machine; and

Figure 9:
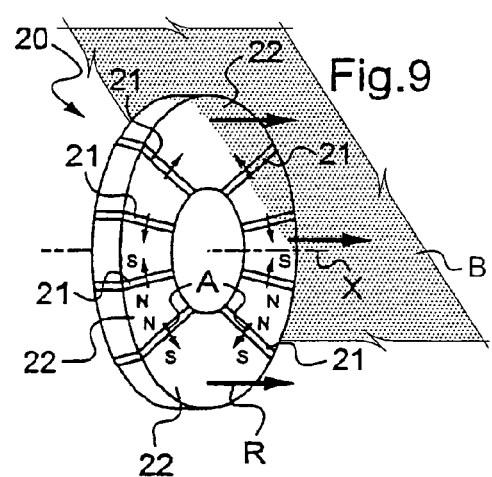

FIG. 9 shows a variant embodiment.

Figure 1:
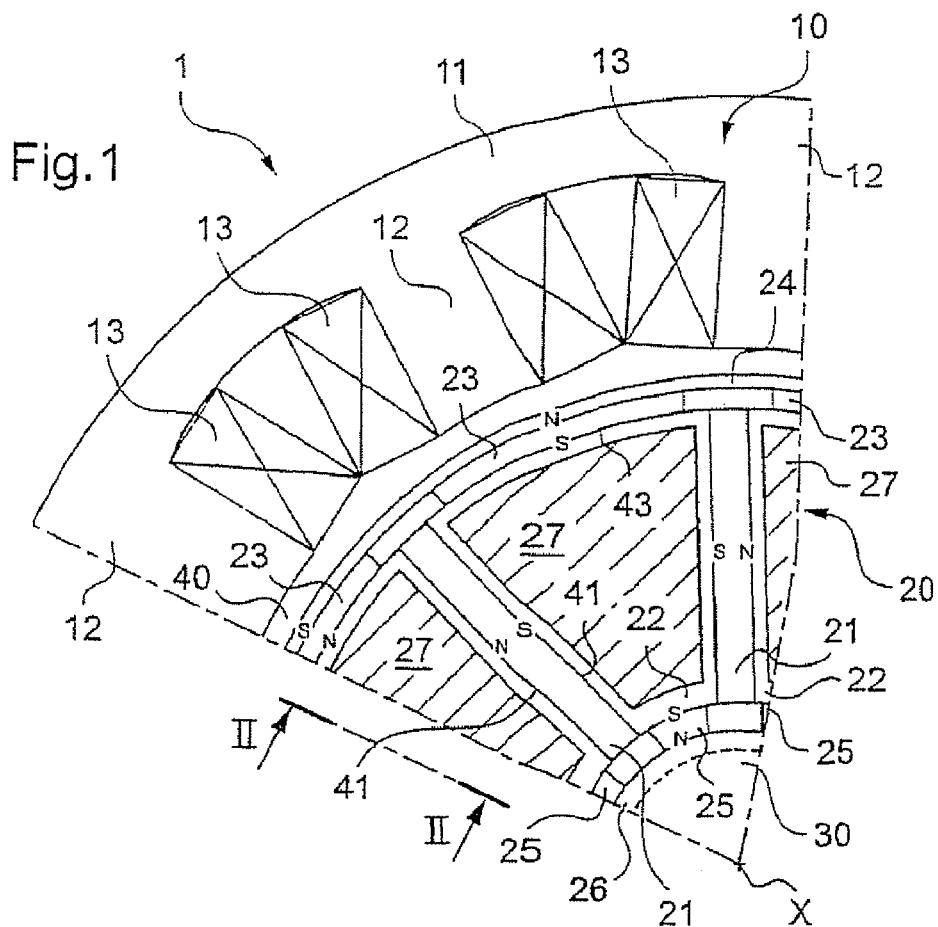
FIG. 1 is a diagrammatic and fragmentary cross-section of an electrical machine of the invention.
Figure 2:
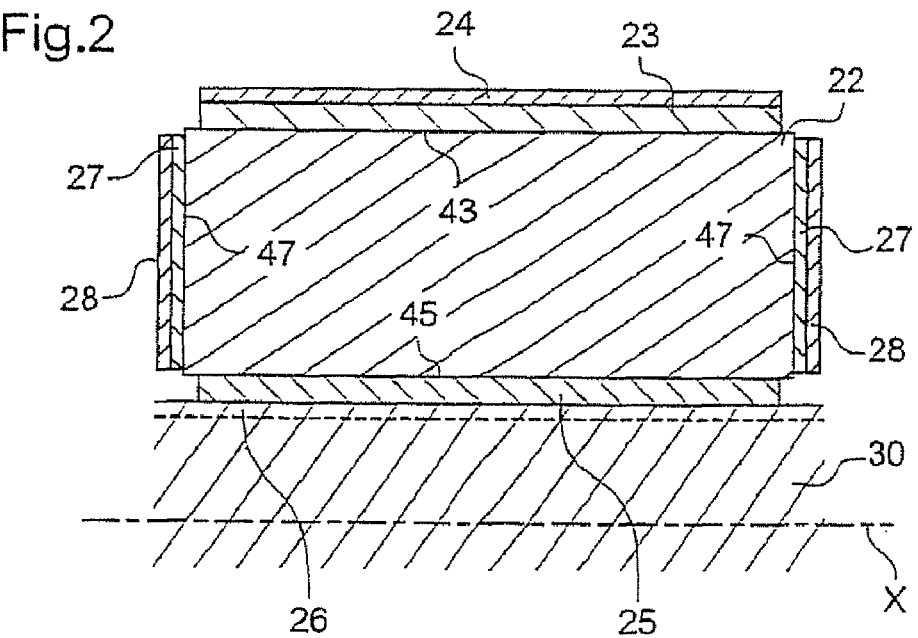
FIG. 2 is a diagrammatic and fragmentary axial section on II-II of the FIG. 1 machine.

FIGS. 1 and 2 show an electrical machine comprising a radially outer stator 10 and a radially inner rotor 20, the stator 10 and the rotor 20 being concentric about an axis of rotation X of the rotor.

An airgap 40 is provided between the stator 10 and the rotor 20.

The stator 10 comprises a magnetic circuit 11 having teeth 12 on which individual coils 13 are disposed. The stator 10 has a concentrated winding. By way of example, the magnetic circuit 11 may be constituted by superposed magnetic laminations or by a resin filled with magnetic particles.

The stator 10 may comprise identical superposed laminations or assembled-together sectors, each sector including one or more teeth, the sectors being interconnected in the middle of a tooth or in the middle of a slot formed between two successive teeth.

The winding of the stator 10 may be distributed, where appropriate.

In the example shown in FIG. 1, the teeth 12 of the stator 10 do not have pole shoes, but it would not go beyond the ambit of the present invention if the teeth 12 did have pole shoes.

The rotor 20 comprises permanent magnets 21 disposed between pole pieces 22 that conduct the flux from the magnets.

By way of example, each pole piece 22 comprises a packet of identical magnetic laminations that are superposed and assembled together. In a variant, the pole pieces comprise a resin filled with magnetic particles.

In the example described, the pole pieces 22 are not magnetically interconnected, but it would not go beyond the ambit of the present invention if the pole pieces were to be magnetically interconnected, in particular by bridges of magnetic material, e.g. for mechanical reasons.

Each pole piece 22 of the rotor 20 is surrounded, not only by the magnets 12 placed on its faces 41 facing the adjacent pole pieces 22, but also by a magnet 23 disposed on the face 43 of the pole piece that faces towards the airgap 40.

In order to enable flux from the magnets 23 to pass, the rotor 20 may also include a tubular casing 24 at its periphery surrounding the magnets 23, as in the example shown. In a variant, the rotor need not have any such tubular casing.

By way of example, the casing 24 is a separate fitted part.

In a variant, as shown in FIG. 3, the rotor 20 does not have any such casing 24, the magnets 23 being received in housings of the pole pieces 22 situated beneath the surfaces 43 of the pole pieces 22 facing the airgap 40. Such a structure can be advantageous from the point of view of machine compactness, and may serve for example to enable its outside diameter to be reduced.

The housings are preferably situated closer to the surface 43 of the pole piece facing the airgap than the surface 45 facing away from the airgap, e.g. at less than half the distance between those two surfaces, or even less that one-third of said distance, or even less than one-fourth.

Magnets 25 are placed on the faces 45 of the pole pieces 22 that are remote from the airgap 40, between the pole pieces 22 and the shaft 30 of the machine.

The flux from the magnets 25 may be looped either via the shaft 30 of the machine, which is then made of a magnetic material, or else in a variant via a sleeve 26 surrounding the shaft 30 of the machine, the sleeve 26 being made of a magnetic material, while the shaft 30 is then made out of a non-magnetic material, for example.

The rotor 20 may include side magnets 27 on either side of the pole pieces 22 relative to the axis X, facing the side faces 47 of the pole pieces 22.

To pass the flux from the side magnets 27, the rotor 20 may include rings 28 of magnetic material at each of its axial ends, as shown in FIG. 2. It is also possible for the rotor 20 to include magnets 27 on one side only or on both sides.

In the examples of FIGS. 1 to 3, the magnets 21 are in the from of rectangular parallelepipeds, but it would not go beyond the ambit of the present invention for them to be wedge shaped, for example, e.g. being of trapezoidal section of width that tapers going radially towards the airgap, or indeed for them to be lozenge-shaped, for example.

In the example shown, the magnets 21 extend over practically the entire radial dimension of the sides of the pole pieces 22, and in contact therewith.

The magnets 23 and 25 are shown as being of curved shape, however it would not go beyond the ambit of the present invention for them to be of some other shape, for example the pole pieces 22 could have plane faces only, with magnets of rectangular section being placed thereon.

The side magnets 27 are shown as being of a shape that matches the shape of the pole pieces 22, covering them almost completely, however the side magnets 27 could cover the side faces of the pole pieces 22 in part only, e.g. being of rectangular cross-section.

In the above-described examples, each pole piece 22 is associated with six magnets 21, 23, 25, and 27, but it would not go beyond the ambit of the present invention for each pole piece to be associated with a smaller number of magnets.

By way of example, FIG. 4 shows a pole piece 22 associated with only three permanent magnets, i.e. two permanent magnets 12 disposed between two consecutive pole pieces, and one magnet 25 disposed on a face 22 of the pole piece 45 that is remote from the airgap.

In a variant embodiment shown in FIG. 5, the pole piece 22 is surrounded by a single permanent magnet 29 of annular shape, such that the pole piece 22 is indeed associated with one permanent magnet in at least three directions of magnetization that are angularly spaced apart by more than 20°, at least one of which is not directed towards the airgap. In the example of FIG. 5, the shape of the magnet 29 is annular, and the magnet 29 is of annular section.

Naturally, it would not go beyond the ambit of the present invention for the shape of the magnet 29 to be of some other section while still remaining annular, for example it could be defined by a closed curve, e.g. an oblong curve or a curve of some other shape, in particular a curve that is substantially polygonal.

In another variant, at least one permanent magnet 21 may be in the shape of a spherical cap, e.g. being substantially hemispherical, surrounding a pole piece 22 that is placed in the concave recess in the magnet, as shown in FIG. 5a. As a result of its shape, the permanent magnet defines a plurality of magnetization directions A that are not coplanar, with a plane that contains at least two of the directions of magnetization. The orientation of the resulting magnetic flux R in the pole piece 22 coincides with the axis of the pole piece 22, for example. The pole piece 22 may have a portion that matches the shape of the concave recess in the magnet. The surface of the pole piece 22 that faces towards the airgap may be plane, concave, or convex.

This surface may be free or it may be covered at least in part by another permanent magnet or by another magnetic part.

In the example of FIGS. 1 and 2, the rotor 20 is an inner rotor, but it would not go beyond the ambit of the present invention for it to be otherwise.

By way of example, FIG. 6 shows a machine having a radially outer rotor 20 and a radially stator 10. The machine of FIG. 4 is generally analogous to that of FIG. 1, and the same implementation variants can be used. For example, the magnets 23 facing the airgap are shown as being placed on the surface of the pole piece 22 and the flux therefrom is looped via a tubular casing 24, however it would go beyond the ambit of the present invention for the magnets to be disposed under the surface of the pole piece 22 that faces the airgap. In another variant, the rotor need not have a tubular casing 24.

A machine of the invention may also include a plurality of rotors as shown in FIGS. 1 and 6, placed end to end along the axis of rotation, and separated by side magnets 27. Under such circumstances, the magnets 28 may be superfluous, except at the two axial ends of the machine.

In the above-described examples, the machine presents radial flux, however it could be otherwise.

A rotor of the invention may be used for example in a discoid machine comprising at least one stator and at least one rotor facing the stator along the axis of rotation.

In a variant, a machine of the invention may have at least two rotors surrounding the stator along the axis of rotation of the machine. The machine may also have two stators disposed axially on either side of a rotor, and two end rotors, or indeed a plurality of rotors and stators that alternate axially.

In a variant embodiment, the machine may include two stators, one radial and the other axial, for example.

By way of example, FIGS. 7 and 8 show a rotor of a discoid machine of the invention comprising magnets 12 placed between the pole pieces 22, magnets 23 facing the airgap, magnets 25 remote from the airgap, and magnets 27 disposed on the side faces 47 of the pole pieces 22 firstly on the outer periphery of the rotor, and secondly on the inner periphery of the pole pieces 22, facing the axis X of the machine.

The flux from the magnets 23 placed facing the airgap and the flux from the magnets 25 remote from the airgap can pass via a magnetic circuit, e.g. including at least one ring 35 disposed between the magnets on the axis of rotation, or indeed two rings 35 disposed at each of the axial ends of the rotor along the axis of the machine. In a variant, the rotor need not have a ring 35 disposed against the magnets that face the airgap.

The flux from the magnets 27 placed on the side faces 47 of the pole pieces 22, at the outer periphery of the rotor may pass via a tubular casing 31 surrounding the magnets 27 at its outer periphery.

The shaft 30 of the machine may be made of a magnetic material suitable for passing the flux from the magnets 27 disposed on the faces of the pole pieces that face towards the axis of rotation of the rotor. In a variant, the flux for the magnets 27 may pass via a sleeve 32 surrounding the shaft 30, the shaft then being made of a non-magnetic material, for example.

In the variant embodiment shown in FIG. 9, the machine comprises at least one discoid rotor 20 facing at least one stator (not shown) along the axis of rotation X. The rotor 20 has permanent magnets 21 disposed between pole pieces 22 that are distributed circumferentially around the axis of rotation X. The direction of magnetization A of these magnets is circumferential. Each pole piece is also associated with a magnet placed behind (not visible in the figure) that defines a third direction of magnetization. The direction R of the resulting magnetic flux from a pole piece is parallel to the axis of rotation X, and towards the stator. Thus, the direction of the magnetic flux resulting from a pole piece 22 and the directions of the associated permanent magnets 21 are not coplanar, with a plane B that contains at lest two of the directions of magnetization.

In variants that are not shown, the rotor has permanent magnets on the faces of the pole pieces that are situated at the outer periphery and/or at the inner periphery, in addition to or replacing magnets situated on the rear faces.

Naturally, the invention is not limited to the embodiments described above.

A discoid machine rotor may also include pole pieces and magnets that are annular, as shown in FIG. 5.

A rotor in accordance with the invention may for example include pole pieces 22 having at least some faces that do not face permanent magnets.

A rotor of the invention may for example have magnets 21 placed between the pole pieces. Magnets may also be placed on the sides of the pole pieces that face the airgap and/or that face away from the airgap, and/or on their lateral sides, as described above.

The magnets may be single pieces or they may be made up of a plurality of magnetic elements placed end to end. The same-polarity magnetic poles of the magnets surrounding a pole piece are directed towards the pole piece.

The permanent magnets may be constituted at least in part by a magnetic material that is in the form of an compacted powder.

The term "comprising a" should be understood as being synonymous with "comprising at least one", unless specified to the contrary.

The invention claimed is:

1. A rotary electrical machine comprising:
   at least one stator; and
   at least one rotor;
   the rotor having an axis of rotation and co-operating with the stator to define at least one airgap, the rotor comprising permanent magnets and pole pieces between the magnets;
   at least one pole piece being associated with at least one permanent magnet to concentrate the magnetic flux from the at least one magnet; and
   the at least one magnet defining at least three different directions of magnetization, the resultant flux in the pole piece towards the stator being non-coplanar with a plane that contains at least two of the directions of magnetization.

2. A machine according to claim 1, in which the resultant flux in the pole piece towards the stator has an orientation that is not coplanar with at least two directions of magnetization.

3. A machine according to claim 1, in which the at least one magnet defines at least three directions of magnetization that are not coplanar with the resulting flux in the pole piece.

4. A machine according to claim 1, in which two of the three directions of magnetization are parallel to a plane perpendicular to the axis of rotation of the rotor.

5. A machine according to claim 1, in which the third direction of magnetization is parallel to the axis of rotation of the rotor.

6. A machine according to claim 1, at least two different directions of magnetization from the at least one magnet associated with a given pole piece being angularly spaced apart by at least 20°.

7. A machine according to claim 1, at least one direction of magnetization of the at least one magnet associated with a pole piece not being directed towards the airgap.

8. A machine according to claim 1, in which the pole piece has at least three faces placed facing permanent magnets.

9. A machine according to claim 1, the pole pieces having faces directed towards the airgap and facing permanent magnets.

10. A machine according to claim 1, the rotor comprising permanent magnets placed in housings in the pole pieces beneath the surface facing the airgap.

11. A machine according to claim 1, the pole pieces having faces facing away from the airgap that are disposed facing permanent magnets.

12. A machine according to claim 1, at least one permanent magnet facing a side face of a pole piece.

13. A machine according to claim 1, at least one permanent magnet facing a face of a pole piece situated at the outer periphery of the rotor.

14. A machine according to claim 1, at least one permanent magnet being placed on a face of a pole piece facing the axis of rotation of the rotor.

15. A machine according to claim 1, including at least one magnetic circuit enabling magnetic flux to pass between two circumferentially-consecutive magnets.

16. A machine according to claim 1, in which the magnetic circuit comprises a ring placed against the magnets along the axis of the machine.

17. A machine according to claim 15, in which the magnetic circuit comprises two rings disposed at each of the axial ends of the rotor.

18. A machine according to claim 15, in which the magnetic circuit includes a tubular casing surrounding the periphery of the rotor.

19. A machine according to claim 15, in which the magnetic circuit includes a sleeve surrounding a shaft of the rotor.

20. A machine according to claim 19, in which the shaft is made of a non-magnetic material.

21. A machine according to claim 15, the rotor including a shaft made of a magnetic material.

22. A machine according to claim 1, the permanent magnets being disposed on at least one face of a pole piece facing towards an adjacent pole piece.

23. A machine according to claim 1, in which at least one pole piece is associated with a magnet of annular shape.

24. A machine according to claim 1, in which at least one pole piece is associated with a permanent magnet of hollow shape.

25. A machine according to claim 1, in which the pole pieces are not magnetically interconnected.

26. A machine according to claim 1, in which the pole pieces are magnetically interconnected.

27. A machine according to claim 1, the stator including magnetic cores on which coils are disposed, the magnetic cores comprising a strip of rolled-up sheet material.

28. A machine according to claim 1, in which at least one of the pole pieces of the rotor, the magnetic cores of the stator, and/or the magnetic circuit of the rotor comprises a rolled-up strip of sheet material.

29. A machine according to claim 1, in which the resulting flux in at least one pole piece has a direction that is parallel to the axis of rotation.

30. A machine according to claim 1, in which the rotor faces the stator along the axis of rotation.

31. A machine according to claim 1, having two rotors disposed on either side of the stator along the axis of rotation.

32. A machine according to claim 30, including two stators disposed on either side of a central rotor.

33. A machine according to claim 1, in which the resulting flux in at least one pole piece has a direction that is perpendicular to the direction of rotation.

34. A machine according to claim 33, the rotor and the stator being concentric.

35. A machine according to claim 34, in which the rotor is a radially-outer rotor.

36. A machine according to claim 34, including a radially-outer rotor and a radially-inner rotor.

37. A machine according to claim 34, the rotor being a radially-inner rotor.

38. A machine according to claim 1, in which the stator has a concentrated winding.

39. A machine according to claim 1, each pole piece presenting a hexahedral shape.

40. A machine according to claim 4, in which the resultant flux is in a direction that is parallel with the axis of rotation of the rotor.

* * * * *